United States Patent
Meredith et al.

(10) Patent No.: US 10,154,501 B2
(45) Date of Patent: Dec. 11, 2018

(54) DETERMINING WIRELESS NETWORK AVAILABILITY FOR CONNECTED VEHICLES

(71) Applicant: AT&T Intellectual Property I, L.P., Atlanta, GA (US)

(72) Inventors: Sheldon Meredith, Roswell, GA (US); William Cottrill, Canton, GA (US); Brandon Hilliard, Canton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/462,211

(22) Filed: Mar. 17, 2017

(65) Prior Publication Data

US 2018/0270831 A1 Sep. 20, 2018

(51) Int. Cl.
| | |
|---|---|
| H04W 72/04 | (2009.01) |
| H04W 4/04 | (2009.01) |
| H04W 4/02 | (2018.01) |
| H04M 3/42 | (2006.01) |
| H04W 4/029 | (2018.01) |

(52) U.S. Cl.
CPC ... *H04W 72/0486* (2013.01); *H04M 3/42178* (2013.01); *H04W 4/027* (2013.01); *H04W 4/029* (2018.02); *H04W 4/046* (2013.01); *H04W 72/048* (2013.01)

(58) Field of Classification Search
CPC ....... H04L 43/062; H04L 67/20; H04L 67/26; H04M 15/58; H04M 15/83; H04M 15/854; H04M 15/00; H04M 15/41; H04M 15/60; H04M 15/74; H04M 15/765; H04M 15/7652; H04M 15/775

USPC .......................................................... 455/419
See application file for complete search history.

(56) References Cited

U.S. PATENT DOCUMENTS

| | | |
|---|---|---|
| 5,751,245 A | 5/1998 | Janky et al. |
| 6,317,060 B1 | 11/2001 | Jones |
| 6,480,783 B1 | 11/2002 | Myr |
| 6,763,299 B2 | 7/2004 | Jones |

(Continued)

FOREIGN PATENT DOCUMENTS

WO 2001022112 A1 3/2001

OTHER PUBLICATIONS

Bayram et al., "A Survey on Communication Technologies and Requirements for Internet of Electric Vehicles," EURASIP Journal on Wireless Communications and Networking, 2014, Springer, 21 pages.

(Continued)

*Primary Examiner* — Timothy Pham
(74) *Attorney, Agent, or Firm* — Amin, Turocy & Watson, LLP

(57) ABSTRACT

A more efficient network can be achieved using over the air (OTA) software updates for connected vehicles. Based on a connected vehicles batter power, OTA updates can be performed in accordance with base station devices while the base station devices are not at or near a capacity. Other factors that can determine when and where an OTA software push is performed can comprise vehicle speed, base station communication range, traffic density, etc. Analysis of historical route data for vehicles and historical capacity data for base station devices can also help facilitate determining a wireless network availability for connected vehicles.

20 Claims, 12 Drawing Sheets

(56) References Cited

U.S. PATENT DOCUMENTS

| | | | |
|---|---|---|---|
| 7,650,229 | B2 | 1/2010 | Dorfstatter et al. |
| 7,721,337 | B2 | 5/2010 | Syed |
| 7,881,838 | B2 | 2/2011 | Larschan et al. |
| 8,095,635 | B2 | 1/2012 | Wang et al. |
| 8,442,758 | B1 | 5/2013 | Rovik et al. |
| 8,527,485 | B2 | 9/2013 | Marzani et al. |
| 8,565,943 | B2 | 10/2013 | Weinmann et al. |
| 8,818,392 | B2 | 8/2014 | Chetlur et al. |
| 8,965,695 | B2 | 2/2015 | Tzamaloukas |
| 9,003,500 | B2 | 4/2015 | Oglesbee et al. |
| 9,161,200 | B2 | 10/2015 | Guday et al. |
| 9,277,451 | B1 | 3/2016 | Rasool et al. |
| 9,390,620 | B2 | 7/2016 | Gueziec et al. |
| 2010/0311435 | A1 | 12/2010 | Mueck et al. |
| 2013/0045683 | A1* | 2/2013 | Wang .................. H04B 5/0037 455/41.2 |
| 2014/0068212 | A1 | 3/2014 | Lin et al. |
| 2015/0026312 | A1 | 1/2015 | Othmer et al. |
| 2016/0099876 | A1* | 4/2016 | Oezdemir .............. H04W 4/21 709/202 |

OTHER PUBLICATIONS

Erol-Kantarci et al., "Energy-Efficient Information and Communication Infrastructures in the Smart Grid: A Survey on Interactions and Open Issues," IEEE Communications Surveys & Tutorials, 2015, pp. 179-197, vol. 17, No. 1, 19 pages.

Dakroub et al., "Analysis of Software Update in Connected Vehicles," SAE International Journal of Passenger Cars—Electronic and Electrical Systems, Aug. 2014, pp. 411-417, vol. 7, No. 2, 7 pages.

* cited by examiner

DETERMINING WIRELESS NETWORK AVAILABILITY FOR CONNECTED VEHICLES

TECHNICAL FIELD

This disclosure relates generally to facilitating over-the-air updates. More specifically, this disclosure relates to facilitating over-the-air updates for connected vehicles based on determining wireless network availability.

BACKGROUND

Cars, motorcycles, and other vehicles are increasingly wirelessly connected to their sourcing companies. Several goals exist for wirelessly communicating with those vehicles. Transmission of new software updates, advertising to the vehicle, and/or diagnostic information from the vehicle can comprise real-time traffic and routing information.

Over-the-air programming (OTA) or firmware OTA (FOTA) refers to various methods of distributing new software, configuring settings, and updating encryption keys to devices like cellphones, set-top boxes or secure voice communication equipment (encrypted 2-way radios). One feature of OTA is that one central location can send an update to all the users, who are unable to refuse, defeat, or alter that update, and that the update applies immediately to everyone on the channel.

In the context of the mobile content world, these can comprise over-the-air service provisioning (OTASP), over-the-air provisioning (OTAP), over-the-air parameter administration (OTAPA), or provisioning handsets with the necessary settings with which to access services such as wireless application protocols (WAP) or multimedia messaging services (MMS).

A connected car is a car that is equipped with Internet access, and usually also with a wireless area network. This allows the car to share internet access with other devices both inside as well as outside the vehicle. Often, the car is also outfitted with special technologies that tap into the internet or wireless area network (WAN) and provide additional benefits to the driver. Examples comprise: automatic notification of crashes, notification of speeding and safety alerts, weather updates, etc. Concierge features provided by automakers or apps can alert the driver of the time to leave to arrive on time from a calendar, send text message alerts to friends or business associates to alert them of arrival times, and/or help find parking or gas stations.

Connected cars have become a more dominant presence in the network. While the average lifespan of a smartphone is 21 months, a car, on the average, is scrapped after 8 or more years. Therefore, in order to allow customers to keep up with technological evolution, software updates, which can be facilitated OTA, can generate efficiencies for vehicles.

The above-described background relating to OTA updates for vehicles is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
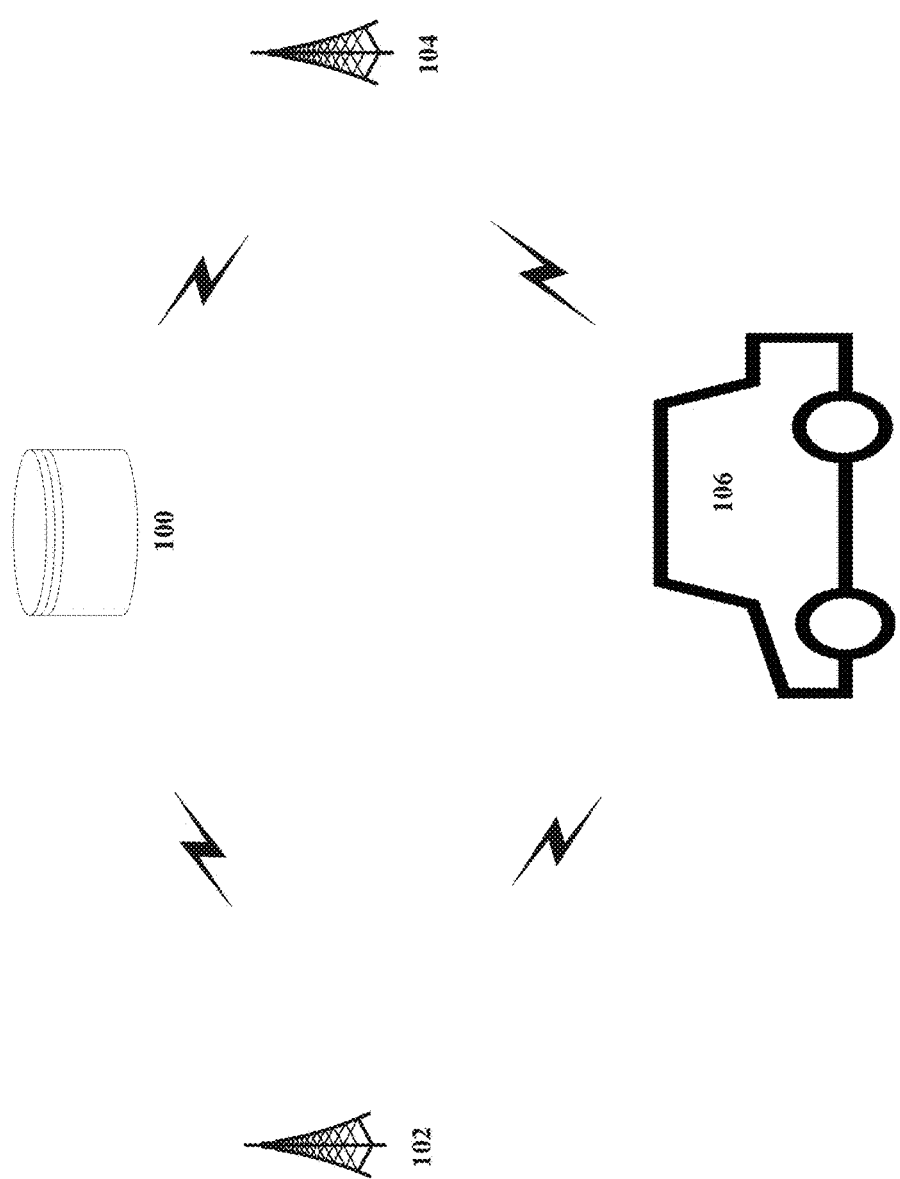
FIG. 1 illustrates an example wireless network comprising a vehicle communicating with the wireless network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate over-the-air updates for connected vehicles based on determining wireless network availability.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, comprising a non-transitory machine-readable storage medium or a machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can comprise UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate over-the-air updates for connected vehicles based on determining wireless network availability.

Facilitating over-the-air updates for connected vehicles based on determining wireless network availability can be with any type of vehicle with a connection to the communications network.

Since an antenna on the roof of a vehicle can invariably get better reception than a handheld device inside the vehicle, internet content can be proxied through the vehicle to mobile devices inside of the vehicle. When a vehicle is turned off, all subsystems of the vehicle are also turned off so as to not drain the battery. However, most vehicles tend to be turned on during peak commuting times when wireless network resources are most constrained. Therefore, a wireless carrier might prefer to send wireless network data during a part of the day when radio utilization is low in order to offer lower data prices. Therefore, the best time for such data transfers, on a per vehicle basis, can be determined without impairing the battery of the vehicle and its ability to start reliably.

Pseudo-real-time utilization data can be collected for every base station radio in a mobile carrier's network. Such data can be made available to both the vehicle and remote server ends of communications. Pseudo-real-time utilization data can be collected from edge nodes (e.g., eNodeBs and mobility management entities (MME)) of the mobile radio network. Mobile devices conducting active sessions through any specific radio can be added and an estimate can be made of the percentage current load on each radio. The analysis can also inspect multipurpose internet mail extension (MIME) types of the active communications from all users, on each radio, in order to estimate any overhead bandwidth to reserve, since some MIME types have a higher peak-to-average data usage than others. This analysis can involve knowing when the peak utilization times are, in the mobile radio network, for routes typically being traveled by the vehicle. Therefore, a history of accurate vehicle routing can be captured via a global positioning system (GPS), via WI-FI-based locating, or a hybrid of both. Additionally, knowledge about network utilization (from radio network nodes as a function of time) and historical "on times" of the vehicle, can be leveraged to analyze this data. Alternatively, some vehicles are typically used during off-peak hours such that transfers of data files can occur without notable impact to network radio resources.

This disclosure can be used to determine times associated with available radio network resources based on routes typically used by a vehicle, and it can also determine if the vehicle's normal usage times correspond to the most available network times. Consequently, transfers of data to the vehicle can occur during a non-peak time when the vehicle is being used, which can result in zero impact to the vehicle battery. If however, the vehicle is typically used during the busiest hours, there can be two options. First, a scheduler can be used to inspect a battery charge level of the vehicle and then turn on the vehicle radio and computing sub-system given sufficient battery resources. A message can be sent to a remote server, via the mobile radio network, to indicate readiness to receive files. After receipt and acknowledgement, the vehicle radio and computing sub-system can be powered down to avoid additional battery drain. A second opportunity is to use real-time information about the availability of a base station device and/or radio being used by the vehicle. Thus, during brief periods of high availability, partitioned files can be sent to the vehicle, wherein the partitioned files can be reconstructed when the partitioned files have been transmitted. For instance, a radio can have a nominal load of 90%, which can be considered too high to transmit information to the vehicle. However, even during high nominal loading, there are respites of low loading, especially with data MIME types that have high peak-to-average transmission bandwidth demands. In another example, a network system can know, based on historical data, that on Tuesdays a particular vehicle drives by a specific base station device at a specific time. If the base station device is generally overloaded during that specific time, then it is not a good time for data to be sent to the vehicle. Conversely, the network system can seek to transfer data during a time when the network is only lightly loaded. The network system that is able to measure utilization on a real time basis can provide a basis on which to push data to a vehicle or set an availability flag in an overhead, common channel, message stream that can prompt the vehicle to request the sequential file partitions (e.g., segments/portions).

It should be noted that other factors can also be taken into consideration with regards to OTA data transfers. For instance, although a base station device might only be lightly loaded, if a vehicle is known to drive by the base station at a high rate of speed (e.g., the vehicle is moving too fast for the data transfer to complete while on this particular base station), then the transfer can be delayed until another time. Thus, the transfer can be dependent upon highway traffic, distance, range of communication of the base station, speed of the vehicle, obstructing objects in the line of sight between the vehicle and the base station, etc. With regards to the aforementioned scenario, since the system has determined that the vehicle is moving too fast for the transfer to complete, the system can preserve data transfer resources for use with other vehicles and/or mobile devices.

It should also be noted that data transfer factors can be real time, historical, and/or a combination of both. Other data transfer factors can include, but are not limited to: an average speed of the vehicle, range of communication between the vehicle and the base station devices, base station device to base station device distance, turn-over communication rate between base station device to base station device, etc. In an alternative example, base station devices can be located relatively close to each other (e.g., every other block) so even if the vehicle is driving slowly (e.g. 20 miles per hour (mph)), then the handover can still happen quickly. In yet another example, the base station devices might only occur every 10 miles and have a 10-mile range of communication. Consequently, even if a vehicle is moving at a high rate of speed (e.g., 85 mph), the data transfer can have ample time occur. Essentially, the system can determine whether to begin, not begin, and/or terminate a data transfer based on an analysis of multiple factors, either in real time, historically, and/or a combination of both.

It should also be noted that an artificial intelligence (AI) component can facilitate automating one or more features in accordance with the disclosed aspects. A memory and a processor as well as other components can comprise functionality with regard to the figures. The disclosed aspects in connection with OTA data transfers for vehicles can employ various AI-based schemes for carrying out various aspects thereof. For example, a process for detecting one or more trigger events, terminating an OTA data transfer, and modifying one or more reported measurements, and so forth, can be facilitated with an example automatic classifier system and process. In another example, a process for penalizing one frequency/technology while preferring another frequency/technology, with regards to OTA transfer, can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of determining wireless network availability for connected vehicles, for example, attributes can be a frequency band, a speed of a vehicle, and a location and the classes can be a data transmission value, a communication handoff value, etc.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing vehicle usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving network capacity data representing a network capacity of a base station device of a wireless network, and receiving vehicle location data associated with a location of a vehicle in relation to the base station device of the wireless network. The method can also comprise receiving battery data associated with a battery charge of the vehicle connected to the base station device of the wireless network. Additionally, based on the network capacity data, the location of the vehicle, and the battery data, the method can comprise sending resource data associated with a resource deliverable by the base station device to be sent to a radio of the vehicle.

According to another embodiment, a system can facilitate, receiving location data associated with a historical location of a vehicle in relation to a base station device associated with a wireless network, and generating load data associated with a historical network load of the base station device. Based on the location data and the load data, the system can comprise generating a firmware download schedule associated with downloading the firmware to the vehicle. Consequently, based on a battery power associated with the vehicle, the system can comprise sending the firmware to the vehicle in accordance with the firmware download schedule.

According to yet another embodiment, described herein is a machine-readable storage medium that can perform the operations comprising receiving location data associated with a current location of a vehicle in relation to a base station device associated with a wireless network. The machine-readable storage medium can also perform the operations comprising receiving battery charge data associated with a battery charge of the vehicle, and assessing load data related to a current network load of the base station device. In response to a condition associated with the current location, the battery charge, and the current network load being determined to have been satisfied the machine-readable storage medium can perform the operations comprising sending firmware to the vehicle for download by the vehicle.

These and other embodiments or implementations are described in more detail below with reference to the drawings.

Referring now to FIG. 1, illustrated is an example wireless network comprising a vehicle communicating with the wireless network according to one or more embodiments. A wireless network can comprise a data repository 100 that can communicate with base station devices 102, 104. The base station devices 102, 104 can also communicate with a vehicle 106. Data related to how much time the vehicle spends communicating with base station devices 102, 104 can be used to determine if and/or when an over-the-air (OTA) software push should take place to the vehicle 106. For example, the system can note that the vehicle 106 spends 60% of its time communicating with the base station device 104 and only 40% of its time communicating with the base station device 102 during its daily commute time. This information can be stored in the data repository 100.

Additional information regarding network capacity can also be stored in the data repository 100. For example, based on common traffic patterns, the system can note that the base station device 104 is generally at 85% capacity during the daily commute time where the base station device 102 is only at 40% capacity during the daily commute time. Consequently, based on an analysis of this data by the system, the system can determine that it may be more efficient to provide OTA software pushes to the vehicle 106 during the latter portion of its commute while it is communicating with the base station device 102 to mitigate the possibility of the OTA software push bringing the base station device 102 to its capacity. It should be noted that this dynamic analysis can be performed for several vehicles and base station devices simultaneously to generate the most efficient outcome for the OTA software push.

Additionally, the system can also take into account other factors, such as the speed of the vehicle 106 and the range of communication it has with a particular base station device 102, 104. For example, although the previous analysis can indicate that it would be best for the OTA software push to take place while the vehicle is in communication with the base station device 102, additional real-time data can suggest otherwise. For instance, if the base station device 102 only has a 1-mile range of communication with the vehicle 106 and the vehicle is traveling at a high rate of speed such that the OTA software push would not complete during the 1 mile range of communication, then it may be best for the system not to begin the OTA software push so as not to tie up additional resources.

Figure 2:
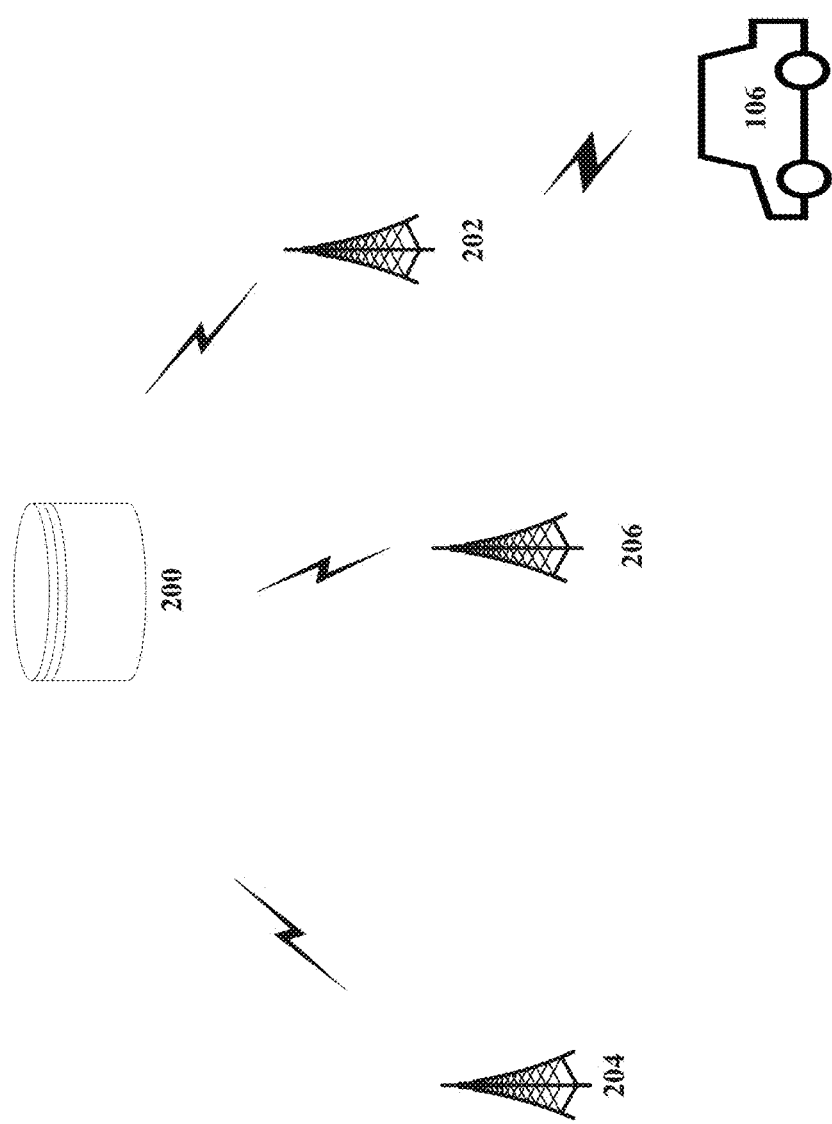
FIG. 2 illustrates an example wireless network comprising a vehicle communicating with the multiple base station devices of the wireless network according to one or more embodiments.

Referring now to FIG. 2, illustrated is an example wireless network comprising a vehicle communicating with the multiple base station devices of the wireless network according to one or more embodiments. FIG. 2 depicts a vehicle 106 that can communicate with and/or receive OTA software pushes from multiple base station devices 202, 204, 206. The multiple base station devices 202, 204, 206 can also communicate with and store data at data repository 200. It should be understood that although three base station devices 202, 204, 206 and one data repository 200 is shown, that any configuration (more or less) of base station devices 202, 204, 206 and data repositories 200 can be used to carry out the current disclosure.

Although FIG. 2 depicts the vehicle 202 as being currently in communication with the base station device 202, at later points in time during the vehicle's 106 commute, it is known (based on historical data stored at the data repository 200) that the vehicle 106 can be in communication with the other base station devices 204, 206. In the event that the system has an OTA software push for the vehicle 106, the system can determine at which base station device 202, 204, 206 the OTA software push should take place to guarantee delivery. For example, the distance between the base station device 202 and the base station device 204 might not allow the OTA software push to take place on the base station device 202 before communication is handed off to the base station device 204. Therefore, the system can decide against beginning the OTA software push on the base station device 202. The system could also determine, either in real time or historically, that during this specific time frame (e.g. 10 am on Tuesday mornings) that the base station device 206 is at or nearing capacity. Therefore, the system can decide that initiating the OTA software push at the base station device 206 is not feasible so as not to overload the base station device 206. Consequently, the system can decide that the base station device 204 is the best option to perform the OTA software push without compromising the overall efficacy of the system.

Figure 3:
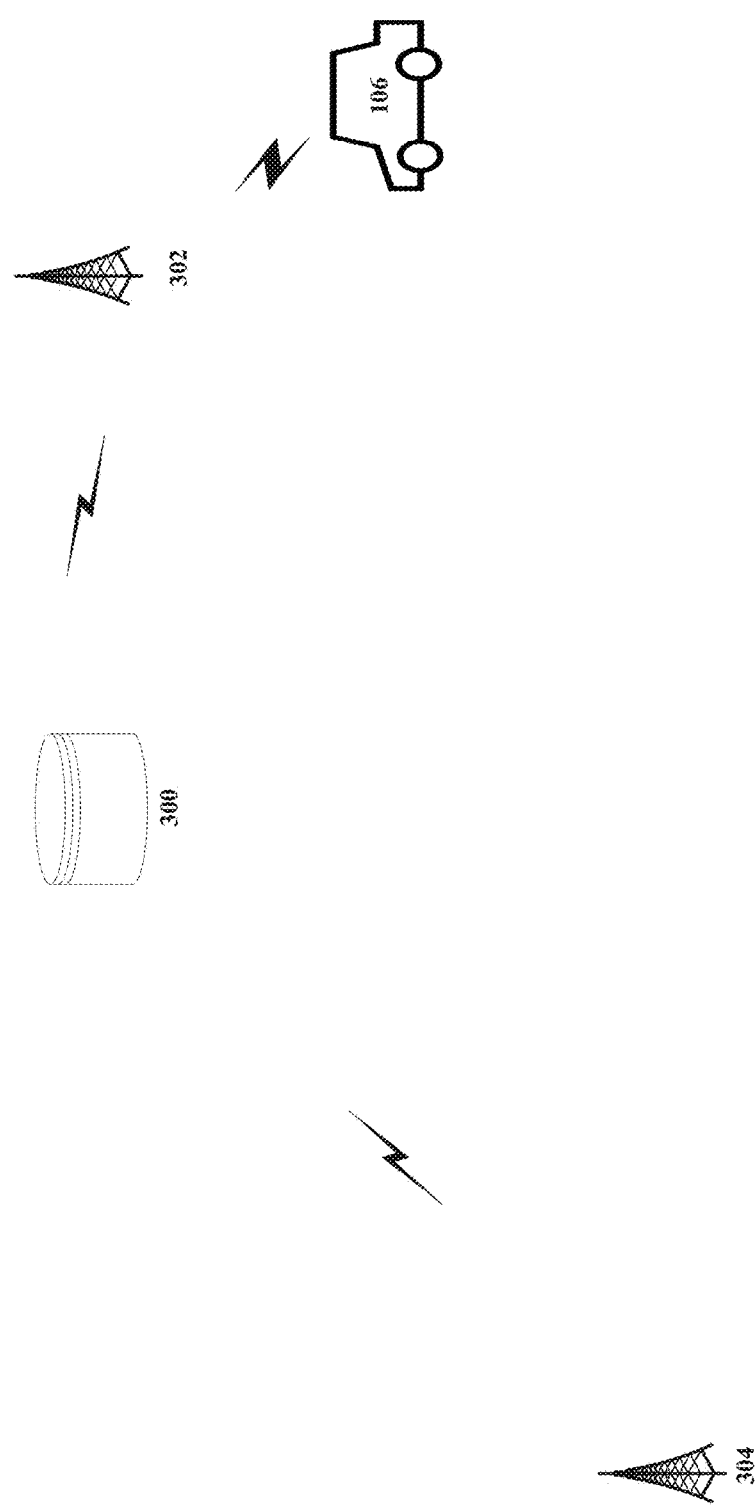
FIG. 3 illustrates an example wireless network comprising a vehicle communicating with the multiple base station devices of the wireless network according to one or more embodiments.

Referring now to FIG. 3, illustrated is an example wireless network comprising a vehicle communicating with the multiple base station devices of the wireless network according to one or more embodiments. FIG. 3 depicts a vehicle 106 that can communicate with and/or receive OTA software pushes from multiple base station devices 302, 304. The multiple base station devices 302, 304 can also communicate with and store data at data repository 300. It should be understood that although two base station devices 302, 304 and one data repository 300 is shown, that any configuration (more or less) of base station devices 302, 304 and data repositories 300 can be used to carry out the current disclosure.

In another embodiment, the base station devices can be distant from each other. For example, assuming that the base station device 302 is 15 miles away from the base station device 304, a decision on which base station device should initiate the OTA software push to the vehicle 106 can depend on several factors (e.g., vehicle speed, range of communication between the base stations, objects obstructing communication, traffic, vehicle location history, vehicle battery, etc.).

Figure 4:
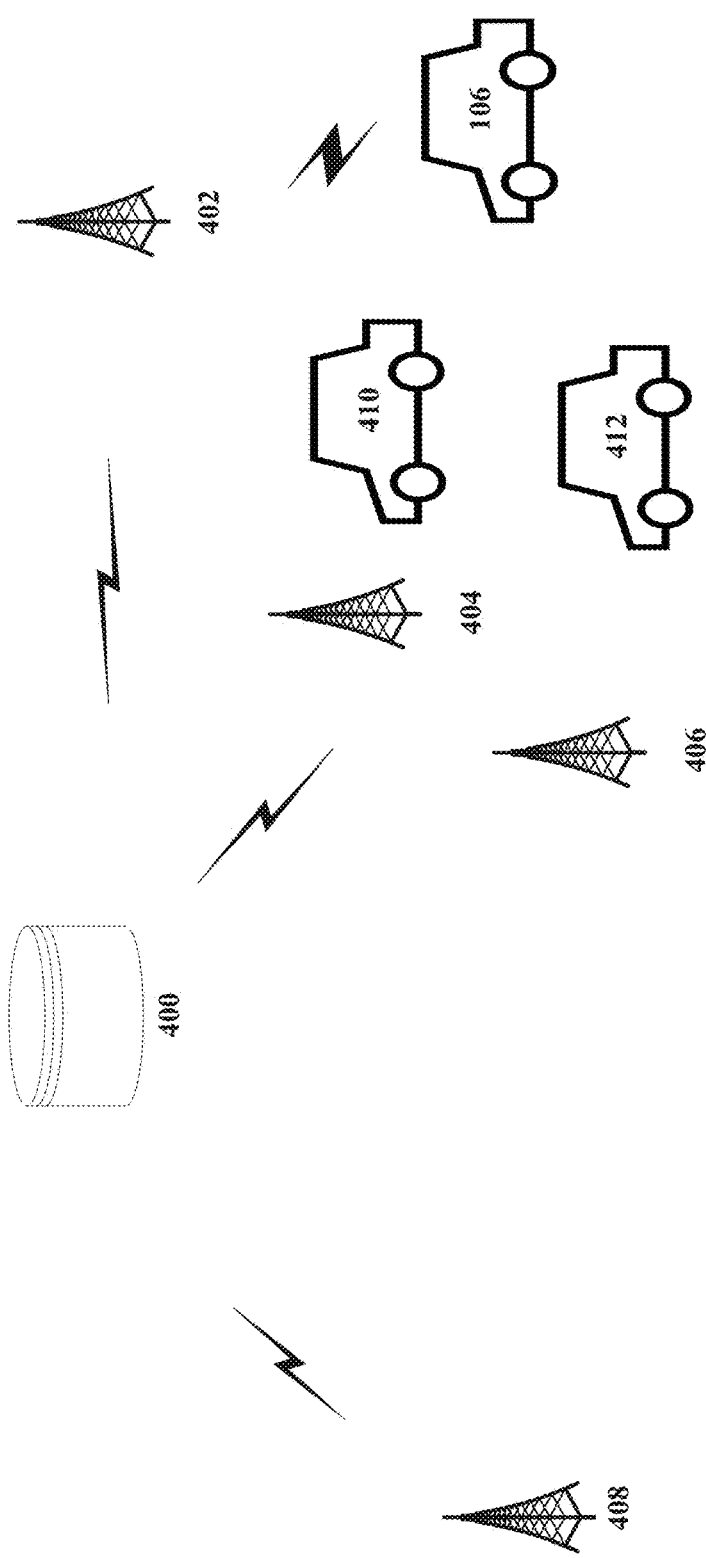
FIG. 4 illustrates an example wireless network comprising a vehicle communicating with the multiple base station devices of the wireless network according to one or more embodiments.

Referring now to FIG. 4, illustrated is an example wireless network comprising a vehicle communicating with the multiple base station devices of the wireless network according to one or more embodiments. FIG. 4 depicts vehicles 106, 410, 412 that can communicate with and/or receive OTA software pushes from multiple base station devices 402, 404, 406, 408. The multiple base station devices 402, 404, 406, 408 can also communicate with and store data at data repository 400. It should be understood that although six base station devices 402, 404, 406, 408 and one data repository 400 is shown, that any configuration (more or less) of base station devices 402, 404, 406, 408 and data repositories 400 can be used to carry out the current disclosure.

Traffic congestion can also play a role in determining when and where for the system to send OTA software pushes to THE vehicles 106, 410, 412. For instance, FIG. 4 depicts heavy traffic congestion by the vehicles 106, 218, 412. Therefore, this can mean that the vehicle 106 might be in communication with a particular base station device 402 longer than expected based on historical data. For instance, data can be stored at the data repository 400 that suggests that the vehicle 106 generally only stays in communication with the base station device for 2 minutes. However, based upon real time data, GPS, navigation, etc., the system can determine that due to traffic conditions, the vehicle 106 will communicate with the base station device 402 for a period of 10 minutes, which can be long enough for a particular OTA software push to take place based on its associated file size.

Conversely, although the vehicle 106 might be in communication with the base station device 402 for a longer period of time, the base station device 402 might also be near or at capacity because it is currently communication with the other vehicles 410, 412 which are causing the traffic congestion. Therefore, the system can determine that it would be more beneficial to provide the OTA software push to the vehicle 106 at a later time. The later time could be determined by the historical data indicating that the vehicle 106 will be in communication with the base station device 204 at a later time during the vehicle's 106 commute.

Figure 5:
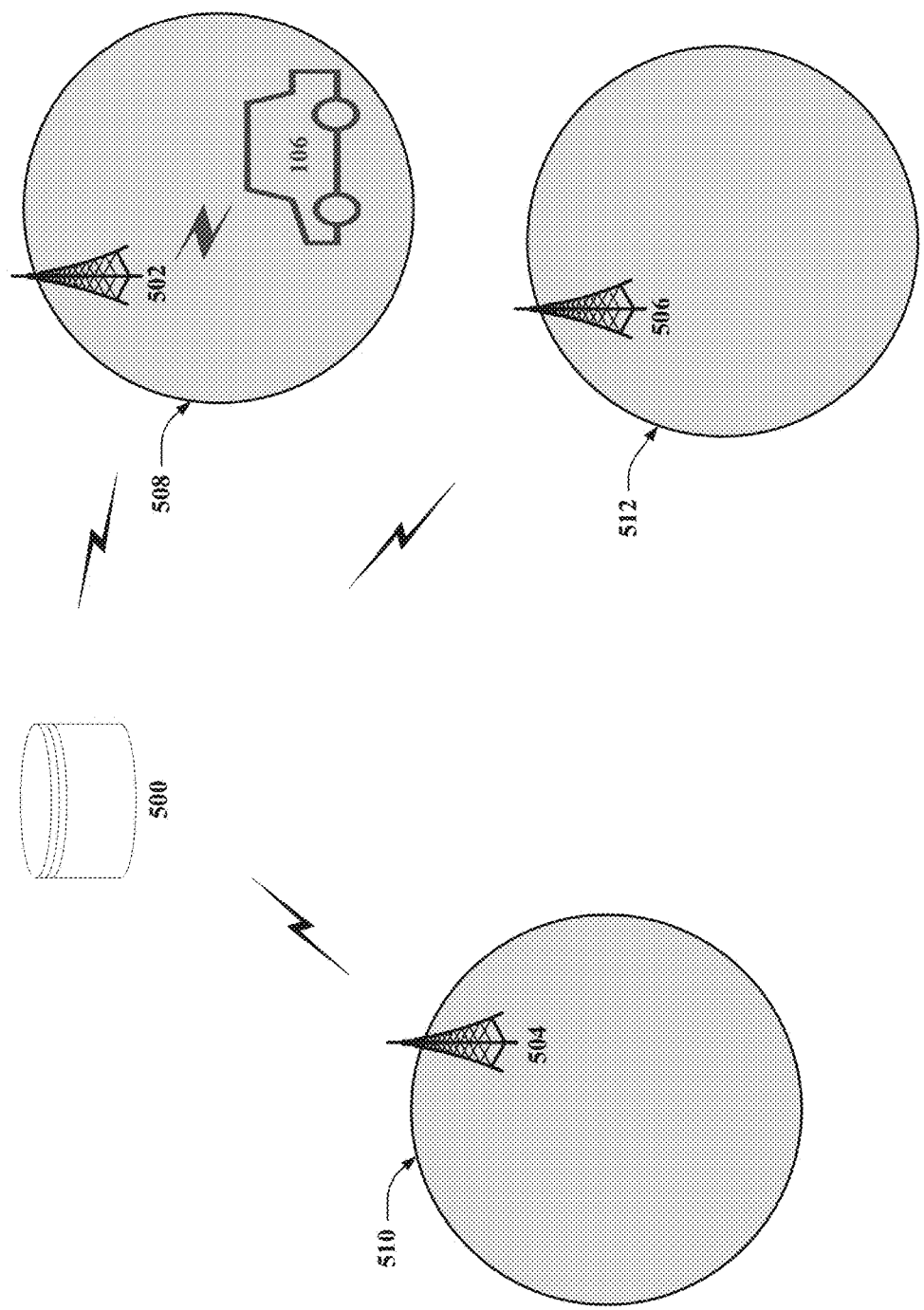
FIG. 5 illustrates an example wireless network comprising a vehicle communicating with the multiple base station devices of the wireless network according to one or more embodiments.

Referring now to FIG. 5, illustrated is an example wireless network comprising a vehicle communicating with the multiple base station devices of the wireless network according to one or more embodiments. FIG. 5 depicts vehicle 106 that can communicate with and/or receive OTA software pushes from the base station device 502 while it is in communication range 508 of the base station device 502. However, communication with the base station device 502 can be dependent upon the vehicle 106 radio being on. For example, if the vehicle 106 is known to spend a lot time (e.g., parked overnight) within the communication range 508, it can be assumed that the vehicle 106 is parked near the owner's place of residence. This data can be communication to the data repository 500. However, while the vehicle 106 is turned off, the vehicle radio is turned off as well. However, an OTA scheduler battery inspection component can be used to inspect the battery strength of the vehicle 106. If the vehicle 106 possesses a specific battery strength and/or has a threshold battery power available, then the OTA scheduler can remotely turn on the vehicle radio and computing sub-system so long as there are sufficient battery resources. The vehicle owner could pre-select certain resources as needed or unneeded to allow the battery threshold values to be modified. For instance, the vehicle owner could preselect the threshold to require that the vehicle 106 have enough battery power to start. Conversely, the vehicle owner could preselect the threshold at a lower value based on certain functionality of the vehicle 106 not being required (e.g. battery strength needed for the radio, GPS, autonomous driving, etc.).

After the OTA scheduler battery inspection component has inspected the battery resources, a message can be sent to a remote server, via the mobile radio network, to indicate the vehicle's 106 readiness to receive files. After receipt and acknowledgement, the vehicle's 106 radio and computing sub-system can be powered down to avoid additional battery drain.

In an alternate embodiment, the vehicle 106 may not have enough battery resources to allow for an overnight OTA software push. However, the system has obtained historical data indication that the vehicle 106 will take one of two routes during the morning commute. For instance, on Tuesday mornings there is a 40% chance that the vehicle will take path one where the vehicle will be in communication range 512 of base station device 506, and a 60% chance that the vehicle 106 will take route two where it will be in the communication range 510 of the base station device 504. Based on real-time traffic conditions, the system might suggest to the vehicle 106 or the vehicle's driver that even though the probability is higher that the vehicle will travel via the second route, all things else being equal, the vehicle 106 should take the first route noting that an OTA software push will occur via the base station device 504 because the base station device 506 is currently, or will be, at or near capacity.

Figure 6:
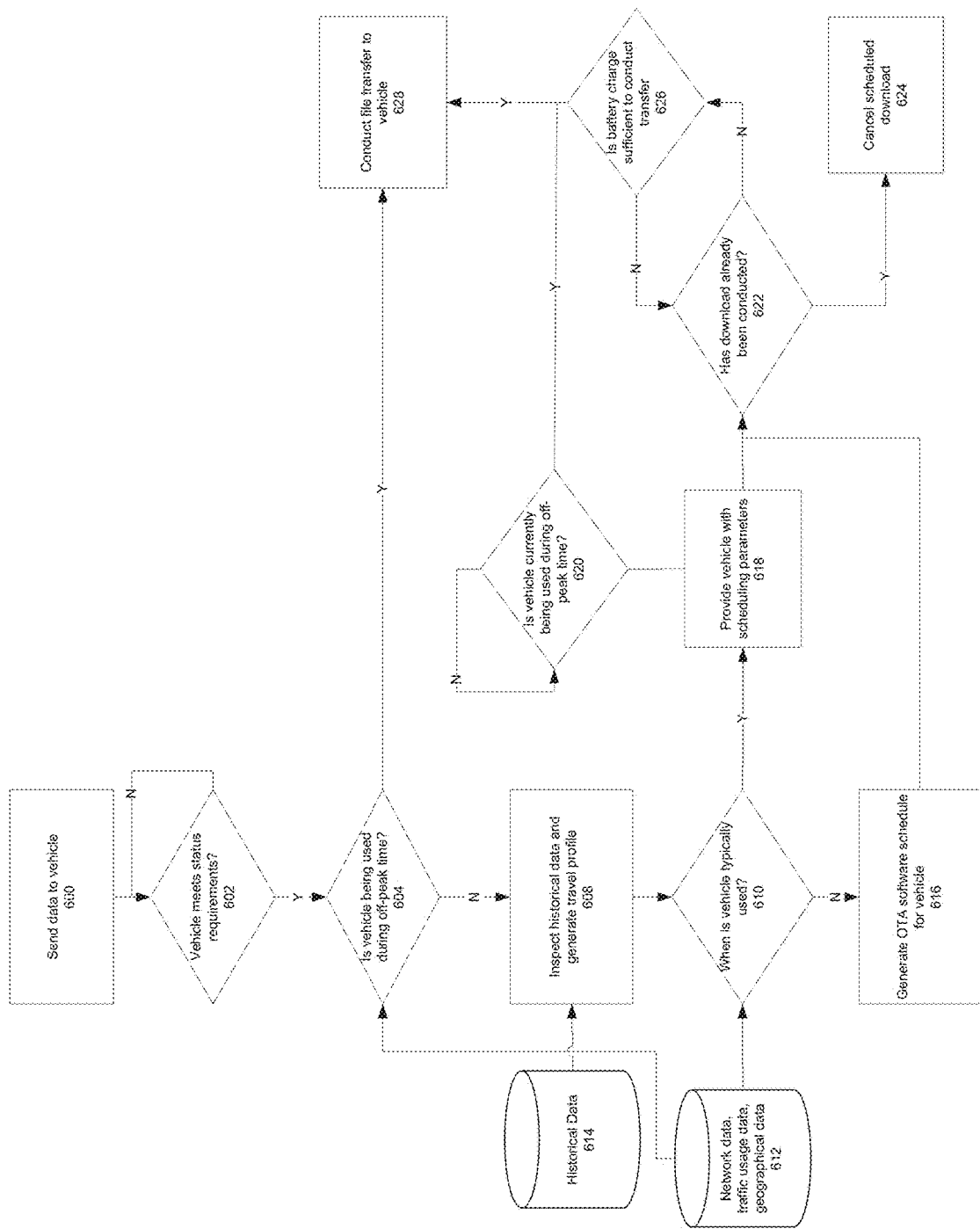
FIG. 6 illustrates an example schematic system block diagram for an OTA software push according to one or more embodiments.

Referring now to FIG. 6, illustrated is an example schematic system block diagram for an OTA software push according to one or more embodiments. At block 600 data can be sent to the vehicle 106 to determine if the vehicle 106 meets a status requirement (e.g., powered on/off, near a base station device, currently in use and communicating over a wireless network, etc.). At decision block 602, if the vehicle 106 does not meet the status requirement, then the system will continually check to see if the vehicle 106 meets the status requirement. However, if the vehicle 106 does meet the status requirement, then the system will move to decision block 604 to determine if the vehicle 106 is being used during an off-peak time. Decision block 604 will also consider data usage time of vehicle 106 for the current mobile location in the network. If the vehicle 106 is not being used during an off-peak time, then the system can move to block 608 to inspect historical data and generate a travel profile for vehicle 106. The historical data can be stored in a database 614, and the historical data can also comprise historical drive routes times associated with the drive routes, location data, etc. The historical data can comprise historical drive routes of the vehicle 106 comprising a time of day. Thus weekday and weekend travel profiles can be generated by the system. Alternatively, if the vehicle 106 is being used during an off-peak time, then a file transfer to the vehicle 106 can be conducted at block 628, wherein the file transfer can come from a remote server device.

Network data regarding a density of voice and traffic usage versus geography can be stored at database 612 and used to provide data to the decision block 604 and decision block 610. Based on the data provided from database 612, decision block 610 can determine when the vehicle 106 is typically used. If the vehicle is typically used during non-peak hours on applicable travel routes, then the decision block 610 can provide the vehicle 106 with scheduling parameters at block 618. The scheduling parameters can comprise a maximum schedule date and time to automatically conduct downloads only if the download is not otherwise completed during off-peak hours when the vehicle 106 is being used. Essentially, the download is likely to occur during non-peak hours while the vehicle is "on", but if it doesn't occur within x time, then force the download during non-peak hours. Block 618 can feed into decision block 620 for a determination on vehicle usage. For example, if the vehicle is not currently being used during off-peak voice and data usage time for the current mobile location in the network, then the system will continue to check to determine when the vehicle is being used under these parameters. However, if the vehicle 106 is currently being used during off-peak voice and data usage time for the current mobile location in the network, then the file transfer can occur at block 628.

Conversely if the vehicle is not typically used during non-peak hours on applicable travel routes, then the decision block 610 can generate an OTA software schedule for the vehicle 106 at block 616. Accordingly, decision block 622 can determine if the download has already been conducted on or after the scheduled date. If the download has already been conducted, then the scheduled download can be canceled at block 624. However, if the download has not already been conducted, then at decision block 626, the system can check to see if there is sufficient battery charge of the vehicle 106 to conduct the file transfer. If there is sufficient battery charge, then the system can conduct the file transfer at block 628. However, if there is not a sufficient battery charge, then the system can recursively check to see if the download has already occurred at decision block 622. It should also be noted that the path comprising blocks 618, 628 and decision block 620 tries to conduct the download to the vehicle with minimal impact. Whereas the path comprising blocks 616, 624, 628, and decision blocks 622, 626 tries to conduct the download with minimal impact to the mobile network resources assuming that vehicle battery power is already below a threshold value.

Figure 7:
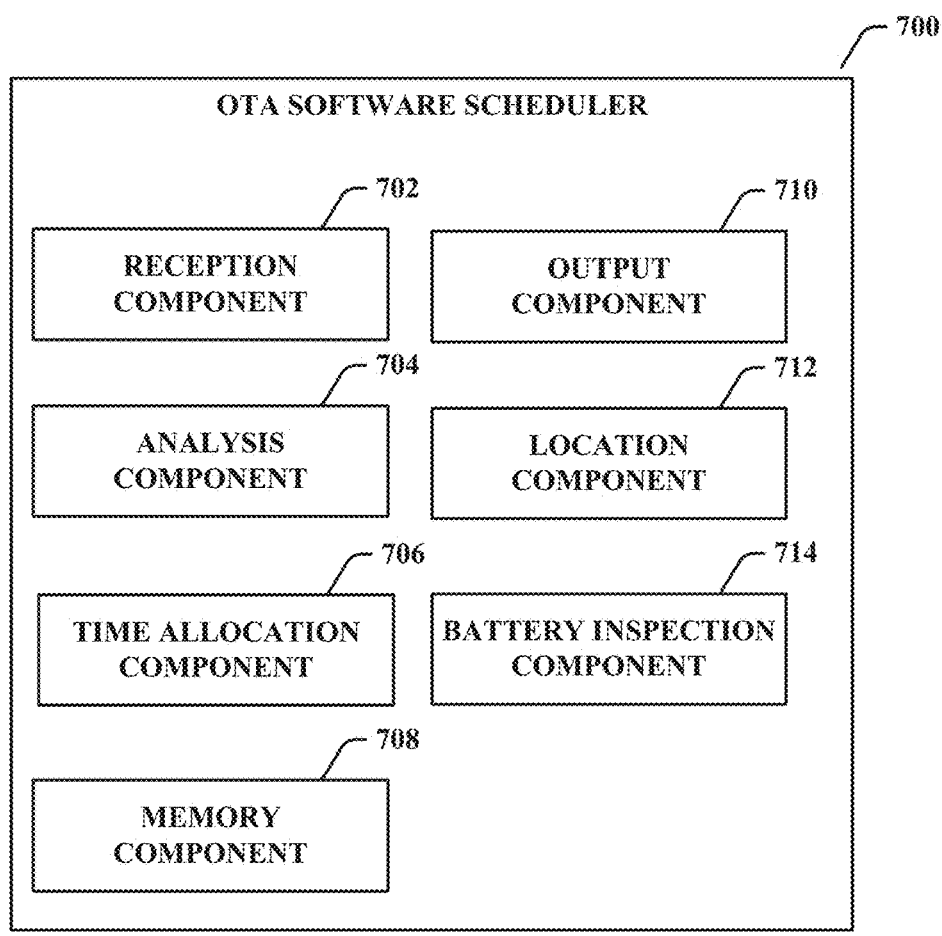
FIG. 7 illustrates an example schematic system block diagram for an OTA software scheduler according to one or more embodiments.

Referring now to FIG. 7, illustrated is an example schematic system block diagram for an OTA software scheduler according to one or more embodiments. The OTA software scheduler 700 can comprise a reception component 702 for receiving data from a user identity and/or vehicle network activity data. An analysis component 704 can analyze and compare the data received from the user identity to the vehicle network activity data, which can then be used to determine when, where, at what base station device, at what speed, etc. that an OTA software push should take place via an output component 710. A location component 712 can be configured to track the location of vehicles (e.g., navigation, GPS, historical, traffic, etc.) and a time allocation component 706 can be configured to track the amount of time a vehicle is in communication with a specific base station device and/or base station devices. A battery inspection component 714 can be configured to determine a battery level and/or battery resources associated with the vehicle 106. Consequently, time allocation data, location data, and/or battery component data can be used as inputs to the analysis component 704 and the output component 710. Data related to all of the aforementioned components can be stored in a memory component 708 for access and utilization at various stages of the OTA software scheduler process.

Figure 8:
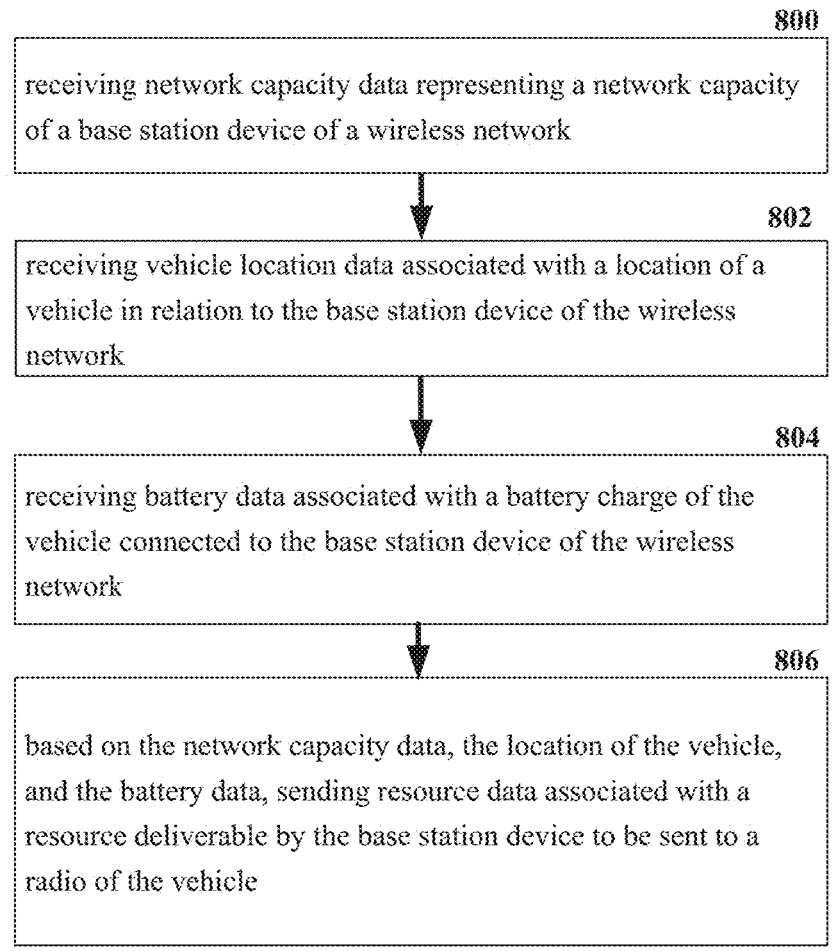
FIG. 8 illustrates an example schematic system block diagram for facilitating wireless network availability for a vehicle.

Referring now to FIG. 8, illustrated is an example schematic system block diagram for facilitating wireless network availability for a vehicle. At element 800, the method can comprise receiving network capacity data representing a network capacity of a base station device of a wireless network (e.g., via the reception component 702). At element 802, the method can comprise receiving (e.g., via the location component 712) vehicle location data associated with a location of a vehicle in relation to the base station device of the wireless network. Additionally, at element 804, the method can comprise receiving (e.g. via the battery inspection component 714) battery data associated with a battery charge of the vehicle connected to the base station device of the wireless network. Consequently, based on the network capacity data, the location of the vehicle, and the battery data, at element 806 the method can comprise sending (e.g., via the output component 710) resource data associated with a resource deliverable by the base station device to be sent to a radio of the vehicle.

Figure 9:
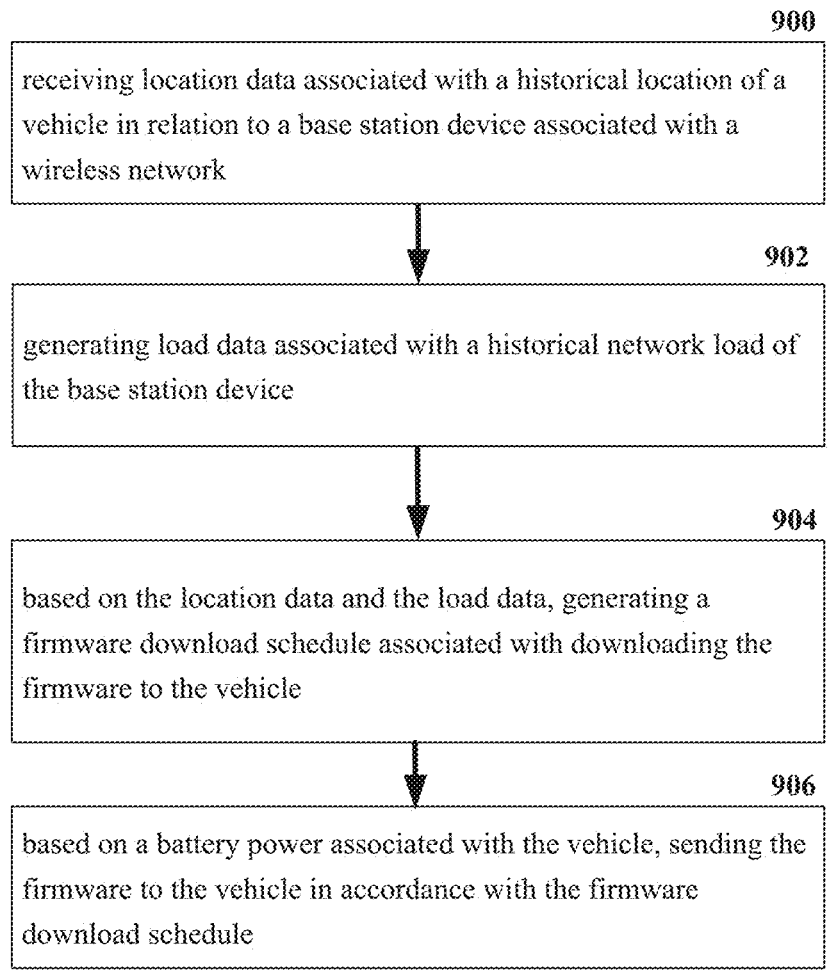
FIG. 9 illustrates an example schematic system block diagram for facilitating wireless network availability for a vehicle based on vehicle battery power.

Referring now to FIG. 9, illustrated is an example schematic system block diagram for facilitating wireless network availability for a vehicle based on vehicle battery power. At element 900, location data can be received (e.g., via the location component 712) associated with a historical location of a vehicle in relation to a base station device associated with a wireless network. At element 902, load data can be generated (e.g., via the memory component 708) associated with a historical network load of the base station device. Based on the location data and the load data, element 904 can comprise generating (e.g., via the time allocation component 706) a firmware download schedule associated with downloading the firmware to the vehicle, and based on a battery power associated with the vehicle, sending the firmware to the vehicle (e.g., via the output component 710) in accordance with the firmware download schedule at element 906.

Figure 10:
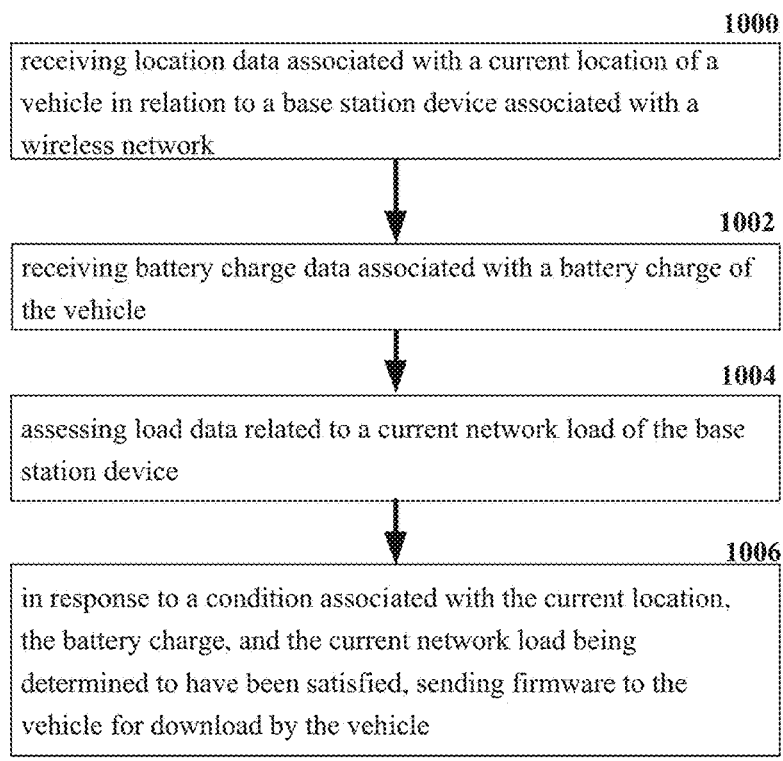
FIG. 10 illustrates an example schematic system block diagram for facilitating wireless network availability for a vehicle.

Referring now to FIG. 10, illustrated is an example schematic system block diagram for facilitating wireless network availability for a vehicle. At element 1000, location data can be received (e.g., via the location component 712) associated with a current location of a vehicle in relation to a base station device associated with a wireless network. At element 1002, battery charge data can be received (e.g., via the battery inspection component 714) associated with a battery charge of the vehicle. Thereafter, the system can assess load data related (e.g., via the analysis component 704) to a current network load of the base station device at element 1004. In response to a condition associated with the current location, the battery charge, and the current network load being determined to have been satisfied, sending (e.g., via the output component 710) firmware to the vehicle for download by the vehicle at element 1006.

Figure 11:
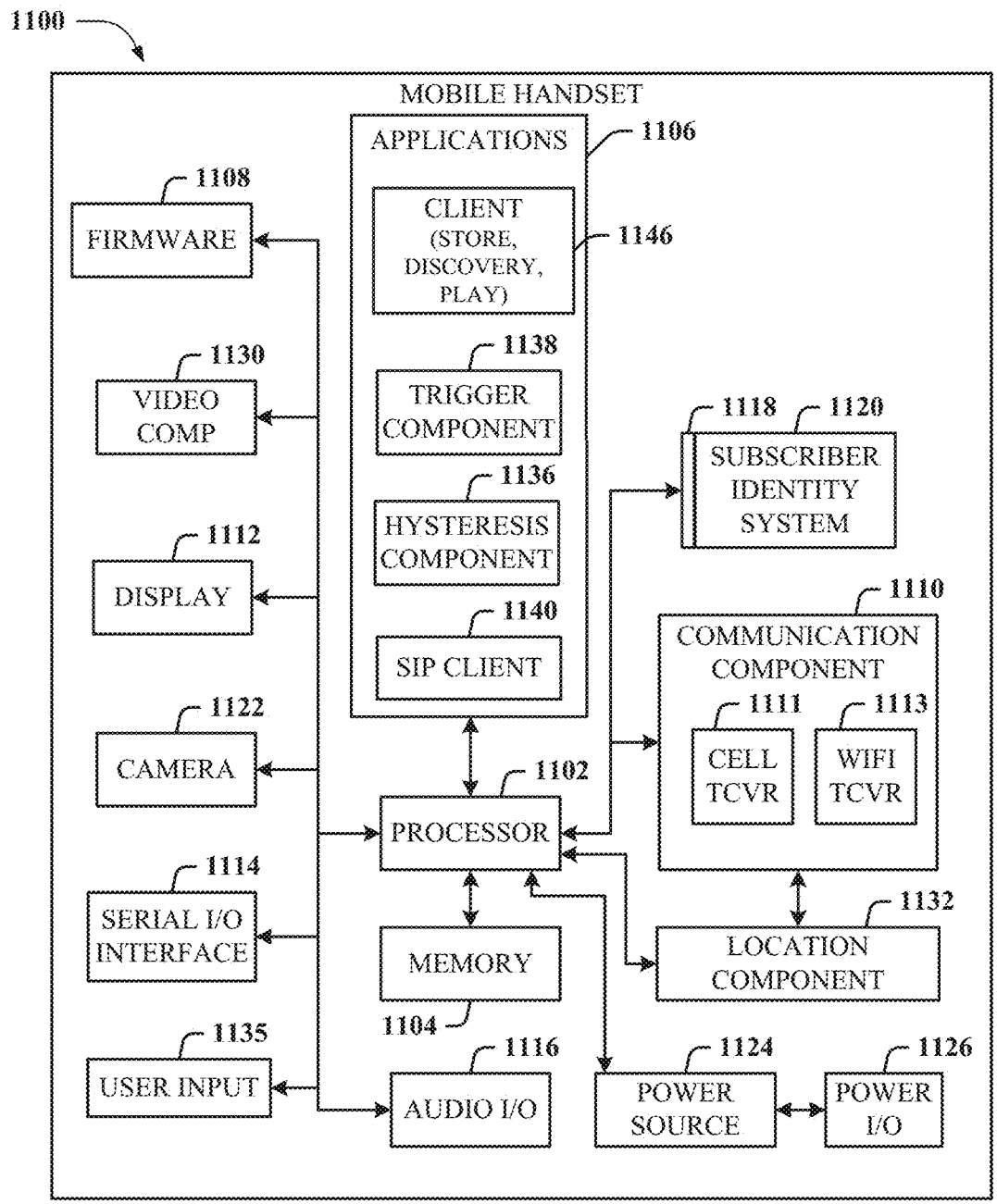
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can comprise routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically comprise a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can comprise volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1100 comprises a processor 1102 for controlling and processing all onboard operations and functions. A memory 1104 interfaces to the processor 1102 for storage of data and one or more applications 1106 (e.g., a video player software, user feedback component software, etc.). Other applications can comprise voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also comprise a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 comprises a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can comprise a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can comprise a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also comprises a power source 1124 in the form of batteries and/or an AC power subsystem, which power source 1124 can interface to an external power system or charging equipment (not shown) by a power I/O component 1126.

The handset 1100 can also comprise a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can comprise such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also comprise a client 1142 that provides at least the capability of discovery, play and store of multimedia content, for example, music.

The handset 1100, as indicated above related to the communications component 810, comprises an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
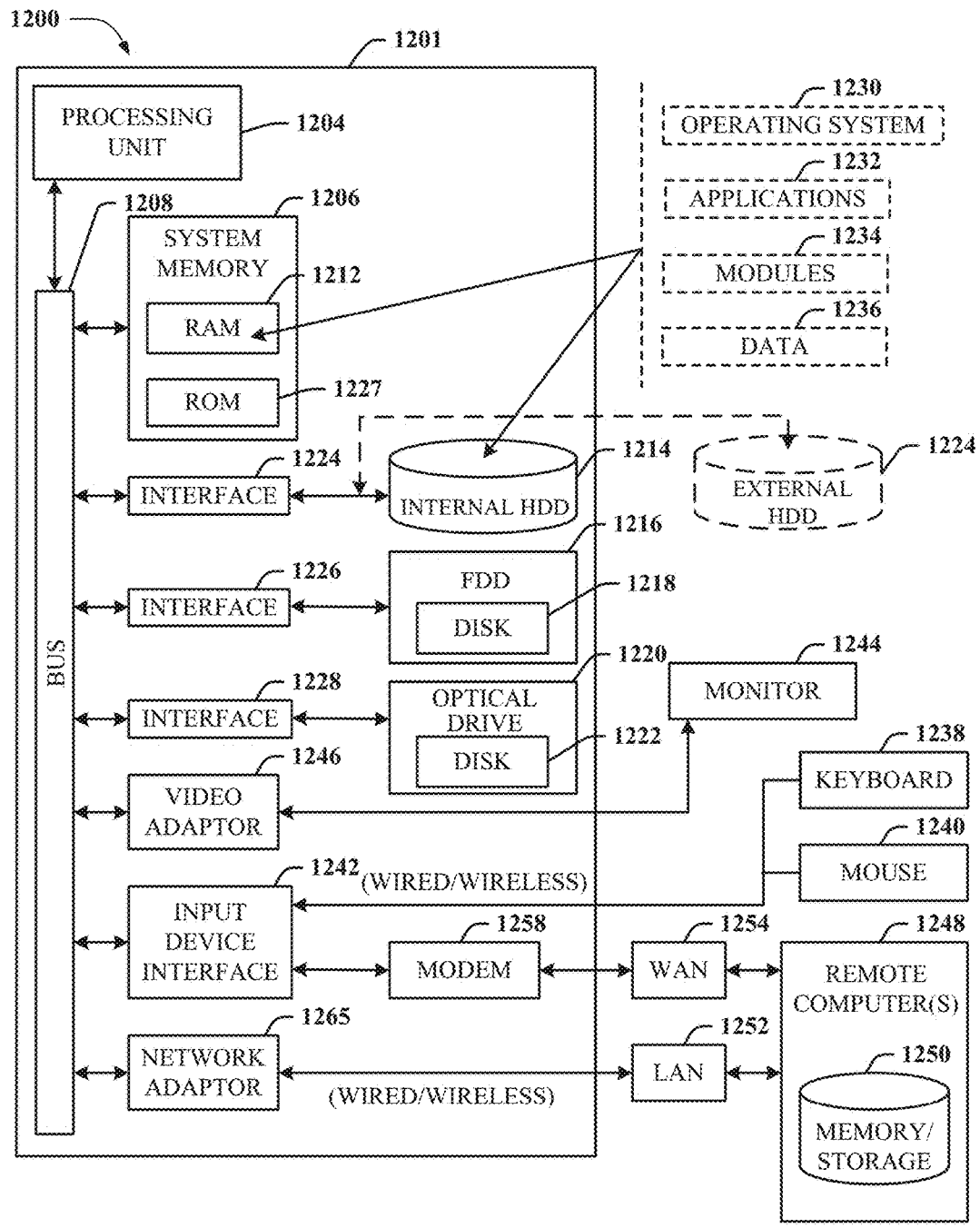
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference to FIG. 12, implementing various aspects described herein with regards to the end-user device can comprise a computer 1200, the computer 1200 comprising a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also comprise a high-speed RAM such as static RAM for caching data.

The computer 1200 further comprises an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1410) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may comprise a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically comprises other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also comprise a wireless access point disposed thereon for communicating with the wireless adapter 1256.

When used in a WAN networking environment, the computer 1200 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a wireless network device comprising a processor, network capacity data representing a network capacity of a base station device of a wireless network, wherein the network capacity data indicates that the wireless network is off-peak based on a current network load being determined to be less than a previous network load;
   receiving, by the wireless network device, vehicle location data associated with a location of a vehicle in relation to the base station device of the wireless network;
   receiving, by the wireless network device, battery data associated with a battery charge of the vehicle connected to the base station device of the wireless network;
   receiving, by the wireless network device, traffic data representative of a traffic pattern; and
   based on the network capacity data, the location of the vehicle, the traffic data, and the battery data, deferring sending, by the wireless network device, firmware data associated with firmware deliverable by the base station device to be sent to a radio of the vehicle.

2. The method of claim 1, further comprising:
   receiving, by the wireless network device, time data related to an amount of time that the radio of the vehicle has been connected to the base station device.

3. The method of claim 2, wherein the sending comprises sending the firmware data at a delayed time.

4. The method of claim 1, wherein the vehicle location data comprises vehicle route data associated with a route taken by the vehicle.

5. The method of claim 1, wherein the sending comprises sending the firmware data during an off-peak time associated with a first network capacity of the base station greater than a second network capacity of the base station.

6. The method of claim 1, further comprising:
   based on assessing the battery data, configuring, by the wireless network device, the radio for receipt of the firmware data.

7. The method of claim 6, further comprising:
   in response to the sending the firmware data, terminating, by the wireless network device, the radio to preserve the battery charge.

8. A system, comprising:
   a processor; and
   a memory that stores executable instructions that, when executed by the processor, facilitate performance of operations, comprising:
   receiving network capacity data of a base station device of a wireless network, wherein the network capacity data is indicative of the wireless network being determined to be off-peak based on a current network load being determined to be less than a previous network load;
   receiving vehicle location data associated with a location of a vehicle in relation to the base station device;
   receiving battery data representative of a battery charge of the vehicle connected to the base station device;
   receiving traffic data representative of a traffic pattern; and
   based on the network capacity data, the vehicle location data, the traffic data, and the battery data, delaying sending firmware data associated with firmware deliverable by the base station device to be sent to a radio of the vehicle.

9. The system of claim 8, wherein the network capacity data comprises overload data indicative of the base station device being overloaded.

10. The system of claim 8, wherein the base station device is a first base station device, and wherein the operations further comprise:
    based on a current location of the vehicle, facilitating sending a portion of the firmware from a second base station device to the vehicle.

11. The system of claim 8, wherein the delaying the sending the firmware is based on a speed of the vehicle in relation to a current location of the vehicle.

12. The system of claim 8, wherein the base station device is a first base station device, and wherein the operations further comprise:
    based on the previous network load of the first base station device, facilitating the sending the firmware from a second base station device.

13. The system of claim 8, wherein the base station device is a first base station device, and wherein the operations further comprise:
    in response to an indication that the vehicle is closer to a second base station device than the first base station device, sending the firmware to the vehicle.

14. The system of claim 8, wherein the operations further comprise:
based on assessing the battery data, configuring the radio for receipt of the firmware.

15. A non-transitory machine-readable storage medium, comprising executable instructions that, when executed by a processor, facilitate performance of operations, comprising:
receiving location data associated with a current location of a vehicle in relation to a base station device associated with a wireless network;
receiving battery charge data associated with a battery charge of the vehicle; receiving traffic data representative of a traffic pattern;
based on a current network load of the base station device being determined to be less than a previous network load of the base station device, receiving network load data representative of a network load of the base station device, wherein the network load data indicates that the wireless network is in an off-peak state; and
in response to a condition associated with the current location, the battery charge, the network load, and the traffic pattern being determined to have been satisfied, deferring sending firmware to the vehicle.

16. The non-transitory machine-readable storage medium of claim 15, wherein the operations further comprise:
assessing the battery charge data to facilitate determining the battery charge of the vehicle.

17. The non-transitory machine-readable storage medium of claim 15, wherein the base station device is a first base station device and wherein the condition comprises an indication that the vehicle is closer to the first base station device than a second base station device.

18. The non-transitory machine-readable storage medium of claim 15, wherein the network load data comprises overload data indicative of the base station device being overloaded.

19. The non-transitory machine-readable storage medium of claim 15, wherein the base station device is a first base station device, and wherein the condition comprises an indication that the vehicle is closer to a second base station device that the first base station device.

20. The non-transitory machine-readable storage medium of claim 19, wherein the operations further comprise:
in response to the indication that the vehicle is closer to the second base station device that the first base station device, sending of the firmware to the vehicle.

* * * * *